United States Patent
Chen et al.

(10) Patent No.: US 9,638,841 B2
(45) Date of Patent: May 2, 2017

(54) LAMINATED DIFFUSER (71) Applicant: MICROSOFT TECHNOLOGY LICENSING, LLC, Redmond, WA (US)

(72) Inventors: Liying Chen, Redmond, WA (US); Karlton David Powell, Lake Stevens, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 246 days.

(21) Appl. No.: 14/250,308

(22) Filed: Apr. 10, 2014

(65) Prior Publication Data
US 2015/0293273 A1 Oct. 15, 2015

(51) Int. Cl.
*H01J 5/16* (2006.01)
*G02B 5/02* (2006.01)
*G02F 1/1335* (2006.01)

(52) U.S. Cl.
CPC ......... *G02B 5/0278* (2013.01); *G02B 5/0221* (2013.01); *G02B 5/0231* (2013.01); *G02F 2001/133607* (2013.01); *G02F 2202/28* (2013.01); *G02F 2203/03* (2013.01)

(58) Field of Classification Search
CPC .................................................. H01K 1/30
USPC ........................................ 313/110, 111, 112
See application file for complete search history.

(56) References Cited

U.S. PATENT DOCUMENTS

| | | | |
|---|---|---|---|
| 6,407,859 B1 | 6/2002 | Hennen et al. | |
| 7,092,166 B1 | 8/2006 | Wood | |
| 7,453,636 B2 | 11/2008 | Yeo et al. | |
| 2005/0007000 A1 | 1/2005 | Chou et al. | |
| 2006/0290253 A1 | 12/2006 | Yeo et al. | |
| 2008/0030649 A1 | 2/2008 | Choi et al. | |
| 2011/0242796 A1 | 10/2011 | Yang et al. | |
| 2013/0039094 A1 | 2/2013 | Kolb et al. | |
| 2013/0224436 A1 | 8/2013 | Kim et al. | |

FOREIGN PATENT DOCUMENTS

| | | |
|---|---|---|
| WO | 2007067603 A1 | 6/2007 |
| WO | 2008134018 A1 | 11/2008 |
| WO | 2009012287 A1 | 1/2009 |

OTHER PUBLICATIONS

ISA European Patent Office, International Search Report and Written Opinion Issued in PCT Patent Application No. PCT/US2015/024410, Jun. 23, 2015, WIPO, 13 Pages.

IPEA European Patent Office, Second Written Opinion Issued in Application No. PCT/US2015/024410, Feb. 19, 2016, WIPO, 8 Pages.

IPEA European Patent Office, International Preliminary Report on Patentability Issued in PCT Application No. PCT/US2015/024410, Jun. 27, 2016, WIPO, 7 pages.

*Primary Examiner* — Vip Patel
(74) *Attorney, Agent, or Firm* — Alleman Hall Creasman & Tuttle LLP (57) ABSTRACT

Embodiments for optical diffusion devices are provided. In one example, an optical diffusion device comprises a first optical element including a first diffusing surface, a second optical element including a second diffusing surface, and an adhesive layer optically coupling the first diffusing surface to the second diffusing surface.

17 Claims, 6 Drawing Sheets

LAMINATED DIFFUSER

BACKGROUND

Optical devices, such as displays, are configured to output light to a viewer. A variety of different types of optical devices may include a diffuser to diffuse the output light.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Embodiments for optical diffusion devices are provided. One example optical diffusion device comprises a first optical element including a first diffusing surface, a second optical element including a second diffusing surface, and an adhesive layer optically coupling the first diffusing surface to the second diffusing surface.

BRIEF DESCRIPTION OF THE DRAWINGS

FIGS. 2A-8 show examples of the diffuser of FIG. 1.

DETAILED DESCRIPTION

Conventional surface diffuser films include a roughened or bumpy surface in contact with air in order to provide a difference in the refractive index between the diffusing surface and the environment. When the diffuser is bound to other optical device elements, such as a lens, display screen, protective surface, etc., the diffusive surface must face away from the optical element to which it is bound, or an air gap must be present between the diffusing surface and the optical element to maintain the diffusing power of the diffuser. If the surface diffuser film or the other optical device buckles and the two surfaces come into contact, or the surface is wetted with a liquid having similar refractive index, light may pass through the media interface or contact point without any diffusion, or at least the level of scatter may be partially nulled.

According to embodiments disclosed herein, a layer of optical adhesive may be optically coupled between the diffusing surfaces of two diffuser layers to create a laminated diffuser. The optical adhesive may have a different refractive index than the refractive index of either of the two diffuser layers. In this way, one or more diffusing surfaces may be buried in the optical stack. The external stack surfaces may then be smooth on both sides. The laminated diffuser does not require air gaps around it and may be optically bound to other film optics without altering the diffusing power of the diffuser. Further, liquid ingress cannot cause the diffuse power to become nulled by being wetted out, as the liquid is prevented from coming into contact with the surface relief of the diffuser layers.

Figure 1:
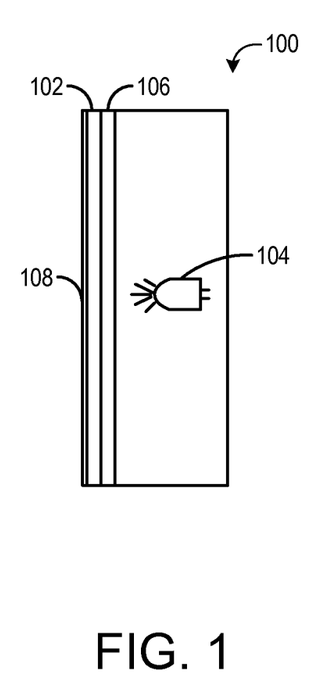
FIG. 1 shows an example optical device including a diffuser.

FIG. 1 schematically shows an example optical device 100 including a laminated diffuser 102. In the illustrated example, optical device 100 may be a display device including a light source 104, one or more transmissive layers 106, and a protective and/or anti-reflective coating 108. However, optical device 100 may include additional or alternative optical elements than the elements illustrated in FIG. 1, such as lenses. Light source 104 may be virtually any light source, such as one or more LEDs, laser diodes, filaments, etc., and further light source 104 may comprise the output of a light guide plate (LGP) for backlight applications. When included, transmissive layer 106 maybe any layer or layers disposed between a viewer and the light source 104. Transmissive layer 106 may be transparent or transmissive of wavelengths of light intended to reach the viewer. For example, the transmissive layer may include a glass or plastic substrate on which the light emitters or other devices for operating the light emitting device are formed (e.g., thin film transistors). Note that a laminated diffuser may be designed to be transparent to wavelengths of light not intended for viewing such as infrared or ultraviolet light, as well as visible light.

Laminated diffuser 102 may include one or more diffusing surfaces configured to diffuse light from light source 104. By diffusing or scattering the light from the light source 104, laminated diffuser 102 may direct light toward a viewer of the optical device 100 over a desired viewing angle. For example, the diffusing surfaces may include gratings, micro-optical arrays, or random, bumpy or roughened surfaces to scatter incoming light from light source 104 towards the viewer.

As explained previously, typical surface diffusers utilize an air gap between the diffusing surface and any adjacent optical elements. The air gap may cause Fresnel reflection losses at the surface-air interface. To counteract these issues, the diffusing surface or surfaces of laminated diffuser 102 may be provided with an adhesive layer optically coupled to the respective diffusing surface to eliminate the air gap. Laminated diffuser 102 may be comprised of one or more surface diffusers (also referred to as surface-relief diffusers). Surface diffusers may increase system efficiency and decrease power consumption while limiting etendue (e.g., viewing angle) as compared to volume diffusers, which suffer from backscatter as well as high background light. It is advantageous to avoid high angle scatter into higher view angles, or scatter into higher spatial frequencies, common with volume diffusers, in displays having low to moderate intended etendue, as any light scattered outside the desired viewing region is wasted light energy.

A device, such as a tablet, TV, smartphone, laptop, or any other computing device with a display, may advantageously employ laminated diffuser 102 to, for example, reduce power consumption and increase battery life based on the efficiencies laminated diffuser 102 may provide. Laminated diffuser 102 may be used to advantageously control viewing angle for a device, such as limiting viewing angle for privacy or efficiency reasons. Additional details of the laminated diffuser 102 will be explained below with respect to FIGS. 2A-8.

The inclusion of the laminated diffuser may be particularly useful in higher resolution display devices, which have considerably reduced pixel size for a given display panel size. The "grain" size of the sparkle, determined by correlation length D, may be reduced in order to remain substantially imperceptible to a viewer of the higher resolution display. Surface-relief diffuser topography may be isotropically scaled down, but only to a diffraction limit, below which the diffuser begins to allow a portion of the input light to pass through without being diffracted or diffused, allowing hot-spotting artifacts.

By applying an adhesive layer having a refractive index higher than that of air to the diffuser, the effective diffuse strength of the diffuser may be reduced relative to the diffuse strength of a diffuser including an air gap. Thus, for a given target angular output profile, when an adhesive layer is coupled to the diffuser, a diffuser having a relatively higher spatial frequency content (correlating or corresponding to its surface relief strength in air) than a diffuser intended to meet a target angular output profile while being used with an air gap maybe utilized. Further, the laminated diffuser may maintain a similar exit angle as standard unlaminated air-gap containing surface diffusers with an effectively reduced sparkle grain size, within the diffraction limit. However, when a single diffusion layer is laminated, the ability to adjust the light output angle may be limited, and the single layer does not reduce sparkle contrast. Further, laminated single diffusers require high spatial frequency diffuser surfaces to achieve a moderate light exit angle. The resulting light exit profile may deviate from a desired near-Gaussian light exit profile to more triangular or cuspy, ramp-like exit profile.

By using two opposing surface relief diffusers each coupled to the adhesive layer, the adjustment range is increased relative to a single laminated diffusing surface, allowing more combinations using standard available transfer adhesives as the adhesive layer. Since higher spatial frequency content diffuser topographies may still be used in laminated diffusers having two opposing diffusing surfaces, the advantage of reduced correlation length is maintained. And further, since the light is allowed to mix along the light propagation direction in the z plane (orthogonal to the diffuser plane), the contrast of the sparkle pattern is also reduced. Angular profiles of the exiting light may be less deviated from Gaussian by selection of a desired surface-relief topography. All these parameters provide for a laminated diffuser usable in an efficient backlight display having reduced correlation length and sparkle contrast, while maintaining the benefits of limited light exit angle.

FIGS. 2A-8 illustrate various embodiments of laminated diffusers that may be utilized in an optical device, such as the optical device 100 of FIG. 1, where an adhesive layer optically couples opposing diffusing surfaces to one another, as described above. Each laminated diffuser of FIGS. 2A-8 are non-limiting examples of laminated diffuser 102 of FIG. 1, and as such may be included in a suitable optical device, such as a display device, to scatter light over a desired viewing angle while reducing internal reflection of the light. Each of the illustrated laminated diffusers includes at least one adhesive layer optically coupling a first diffusing surface of a first optical element to a second diffusing surface of a second optical element. The adhesive layer may be directly coupled to each diffusing surface without intervening elements (e.g., without air gaps or other optical elements).

Figure 2A:
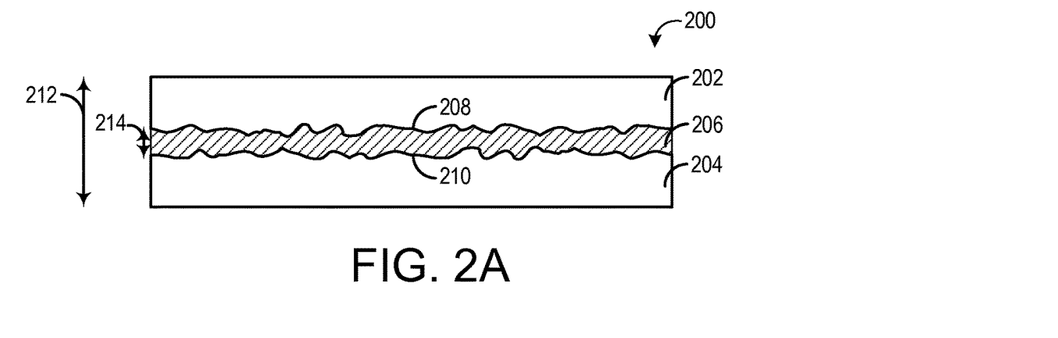

FIG. 2A illustrates a first laminated diffuser 200 according to an embodiment of the present disclosure. Laminated diffuser 200 is one non-limiting example of laminated diffuser 102 of FIG. 1. Laminated diffuser 200 includes two diffuser layers and an adhesive layer coupling the two diffuser layers to each other. Specifically, laminated diffuser 200 includes a first diffuser film 202, a second diffuser film 204, and an adhesive layer 206 optically coupling the first diffuser film to the second diffuser film.

The first diffuser film 202 and the second diffuser film 204 may be any suitable film, such as matted polycarbonate, PET, stretched polyethylene films, sandblasted films or films from sandblasted mold tooling, ball-peened films or films from ball-peened mold tooling, thermally embossed surface structured films, such as embossed cellulose acetate films, clear beaded screen film, laser polymerized randomly structured diffuser formed on a clear substrate, randomly laser drilled film, diffuse surface reliefs replicated onto film substrates by UV curing (such as LUMINIT LSD film or EXXELIS diffuser film), UV casting, or UV replication, and other randomly structured, matted, embossed, or otherwise-formed films.

First diffuser film 202 includes a first diffusing surface 208, and second diffuser film 204 includes a second diffusing surface 210. The first and second diffusing surfaces comprise gratings, UV replicated surfaces, embossing, or otherwise roughened surfaces of the diffuser film that act to scatter or diffuse light entering and/or exiting the diffuser film. Adhesive layer 206 is optically coupled to each of the first diffusing surface 208 and second diffusing surface 210.

Adhesive layer 206 may be comprised of silicone, low refractive index UV-curable resin, or other suitable optically clear material. Adhesive layer 206 may have a refractive index which is either higher or lower than the refractive indices of the first and second diffuser films, such that there is a difference in the refractive index between the first diffuser film index and adhesive, as well as a difference in the refractive index between that of the second diffuser film and the adhesive. In one example, adhesive layer 206 may have a refractive index of 1.41 while the first and second diffuser films each have a refractive index of 1.59. By using a refractive index greater than that of air, or a refractive index difference less than that of film to air, the Fresnel reflection coefficients may be reduced to reduce losses due to reflection at air-to-media interfaces.

Burying or embedding the diffusing surfaces of both individual diffusers inside the laminated diffuser enables the laminated diffuser to be laminated to other elements in an optical stack without air gaps, thus reducing the stack thickness and eliminating the Fresnel reflection loss on the diffusing surfaces. Additionally, the polarization state of input light after exiting the diffusing surface may be better maintained and the scatter of exiting light into higher exit angles may be minimized by the use of surface relief diffusing surfaces having small to moderate Gaussian exit angle profiles.

Additionally, by using a laminated diffuser having two opposing diffusing surfaces, sparkle phenomena on a display surface may also be reduced, and hot spots, which are the transmitted leakage of 0th-order light, may be eliminated by scattering all of the input light energy completely into the diffuse or diffraction envelope.

It is to be understood that the adhesive layer does not necessarily have to mechanically hold the two diffuser layers together, but merely optically couples the diffuser layers together. In some examples, other elements may be used to mechanically couple the diffuser layers together and keep the diffusers from separating. However, in some examples the adhesive layer may mechanically couple the two diffuser layers together as well as optically couple the two diffuser layers to each other, thus improving mechanical strength of the stack, which may include the display panel, thus allowing thinner panel design thickness in some cases for a given mechanical strength requirement.

Figure 2B:
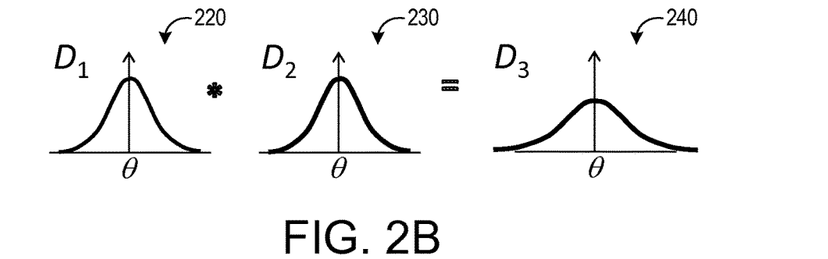
Figure 9:
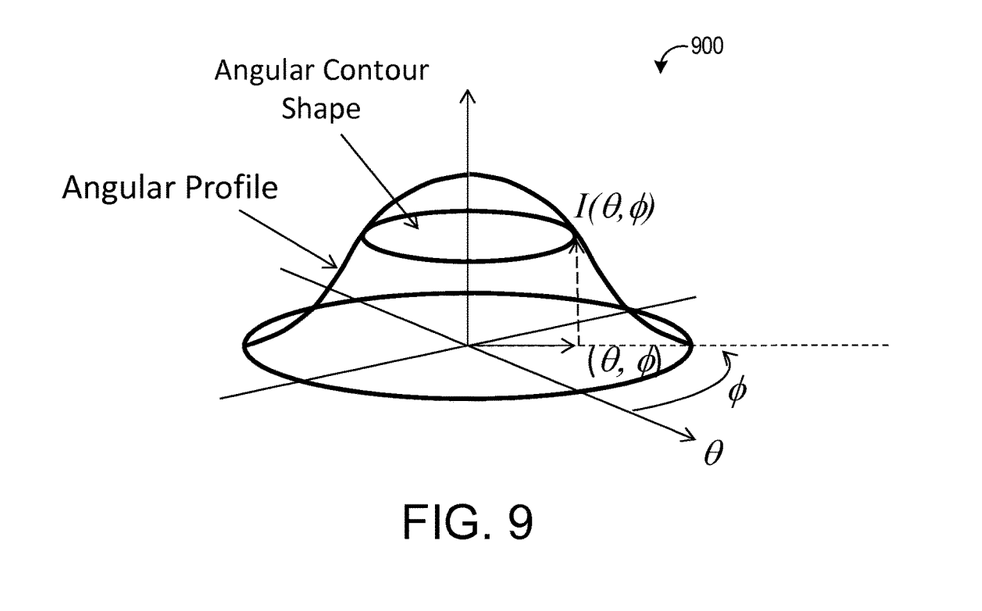
FIG. 9 illustrates an example 3-dimensional plot of light output from an optical device.

FIG. 2B illustrates a convolution of two Gaussian angular profiles, resulting in a Gaussian angular profile having widened angular extent and reduced peak. As shown in FIG. 2B, the first diffuser film 202 may have a first Gaussian output angular profile 220. As used herein, angular profile refers to the angular distribution of intensity through an elevation angle $\theta$ at a given azimuthal angle $\phi$. The angular profile defines intensity versus angle as a slice or cross-section at a given azimuthal angle. An example 3-dimensional plot 900 of light output from an optical device, such as from a laminated diffuser, illustrating an angular profile and angular contour shape is illustrated in FIG. 9. Plot 900 illustrates two angles, an elevation angle $\theta$ and azimuthal angle $\phi$ in polar coordinates, represented within the base plane of the plot. The intensity function $I(\theta,\phi)$ describes the intensity along the angular profile.

The second diffuser film 204 may have a similar, second Gaussian output angular profile 230. When the first diffuser film and second diffuser film are optically coupled in the laminated diffuser, a third Gaussian output angular profile 240 is produced. Thus, when a Gaussian angular profile is convolved with another Gaussian angular profile, it results in a Gaussian output angular profile having an increased FWHM and a reduced peak for a given total light energy.

First diffuser film 202 and second diffuser film 204 may be similar types of diffuser films or each may be a different type of diffuser film. In an example, both first diffuser film 202 and second diffuser film 204 may have circular or round diffusing angular contour shape. As used herein, diffusing angular contour shape refers to the shape of the diffuse output along a given elevation angle. In contrast, as explained above, the term angular profile, as used herein, is the intensity of the output exit profile (e.g., the profile of the diffuse strength) of a slice of output at a given azimuth angle. Thus, a diffuser may have a Gaussian output in exit profile, or angular profile (1D slice in 2D elevation/angle space), but provide circular diffuse output, or angular contour shape (2D shape in 3D angle space). As such, each of the diffuser films may have fixed luminance for a given elevation angle (also referred to as being radially isotropic).

Further, the two diffuser films having a circular angular contour shape may provide symmetric/constant diffusing power to scatter light substantially equally in all azimuthal directions $\phi$ for a given altitude/elevation angle $\theta$. A circular Gaussian light scattering angular contour shape may be produced with two diffuser films having a circular angular contour shape (as a pseudo-triangular, cuspy profile convolved with itself results in nearly Gaussian).

Figure 2C:
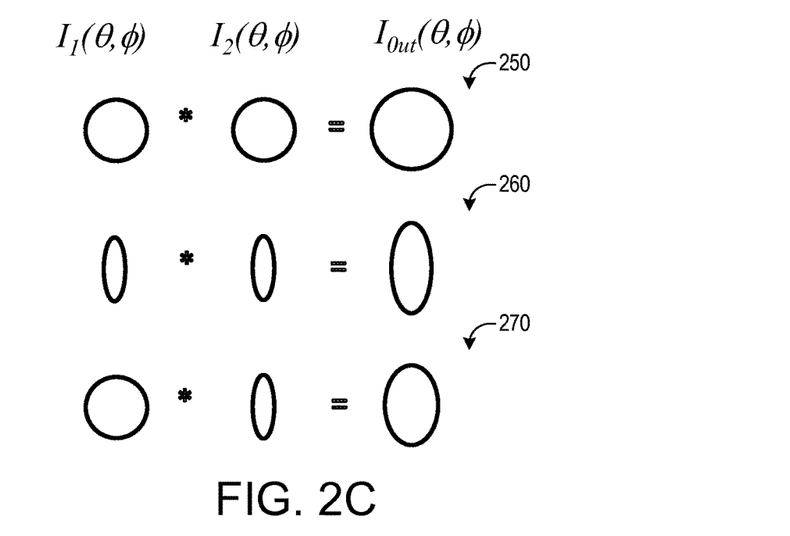

FIG. 2C illustrates the angular contour shape resulting from various convolutions of circular and elliptical angular contour shapes. As illustrated in FIG. 2C, diagram 260 shows a Gaussian diffuser having a circular angular contour shape that is convolved with another diffuser having a circular angular contour shape to result in a circular angular contour shape. As used herein, angular contour shape refers to the angular shape of the output in angle space as defined by a contour in angle space exhibiting a given output intensity, such that the shape may be defined in terms of elevation angle $\theta$ as a function of azimuthal angle $\phi$, as shown in FIG. 9. For example, circular angular contour shape is defined as the angular shape formed by an output having fixed or constant intensity at a constant elevation angle $\theta$, such that an angular sweep of azimuthal angle $\phi$ forms a circular shape in angle space.

In another example, both first diffuser film 202 and second diffuser film 204 may have an elliptical angular contour shape. The two diffusers having an elliptical angular contour shape have radially anisotropic diffusing power to scatter light into an angular profile having more angular width in a given azimuthal direction and less angular width in the orthogonal direction. This provides an additional advantage of maintaining the elliptical diffuse exit profile character as well as elliptical angular contour shape. However, in some cases, a double-elliptical laminated diffuser may introduce an increased sparkle grain size on the display surface due to larger correlation width, or average feature spacing, along one direction across the diffusers (compared to the orthogonal dimension) where this average correlation width may approach the spacing near, or on order of, that of the pixel sizes and pitch. Such tradeoff is typical of light shaping diffusers, due to the method of manufacturing, but may not be the case for alternative type elliptical diffusers having an elliptical angular contour shape which maintain average spacing in both x and y dimensions. Diagram 260 of FIG. 2C shows that by combining two elliptical angular contour shapes, the resulting convolution is also an elliptical angular contour shape.

In yet another example, first diffuser film 202 may be a diffuser film having a circular angular contour shape and second diffuser film 204 may be a diffuser having an elliptical angular contour shape (or vice versa). Thus, the laminated diffuser includes both a diffuser having isotropic output for all azimuth angles $\phi$ within a given elevation angle Band a diffuser having anisotropic output within all azimuth angles $\phi$ within a given elevation angle $\theta$, which offers the additional advantage of controlling the degree of anisotropic diffusing power (e.g., the light exit cone and orthogonal angular profiles exhibit an angular character due to the circular diffuser and maintain a level of ellipticity in between that of the circle and elliptical diffuser)and reducing the possible increased sparkle grain size produced by a double elliptical diffuser. As shown by diagram 270 of FIG. 2C, combinations of circular and elliptical angular contour shapes may be used to achieve an elliptical angular contour shape having eccentricity in between that of circular, $\epsilon=1$, and the elliptical diffuser.

Laminated diffuser 200 may have a thickness 212 in the z plane (orthogonal to the plane of the diffuser films). Similarly, adhesive layer 206 may also have a thickness 214 in the z plane. In one example, the thickness 214 may be an average thickness of the adhesive layer, while in other examples the thickness 214 may be the thickest point of the adhesive layer. It may be desirable to minimize the thickness of the laminated diffuser to minimize the thickness of the optical stack, and thus the adhesive layer 206 and diffuser films may be provided as thin as possible. However, in some examples the thickness 212 of the laminated diffuser and/or and thickness 214 of the adhesive layer may be increased to provide enhanced structural rigidity, to guide the scattered light along a desired path length before encountering other optical elements, enabling additional mixing or homogenizing, etc.

FIGS. 3-6 illustrate examples of a laminated diffuser that include a periodic micro-optical array laminated to a diffuser film. The periodic array may be any suitable periodic array, including prismatic 1D array, prismatic 2D array such as an axicon array or quad or pyramidal array, microlens 1D array, microlens 2D array having various tilings including square or rectangular or hexagonal, sinusoidal array in 1D or 2D 'bumpy corrugations', etc. The diffuser film laminated to the periodic array may be differentiated from the periodic array in that the diffuser film includes a random surface topography, as opposed to the periodic surface topography of the period array.

Figure 3A:
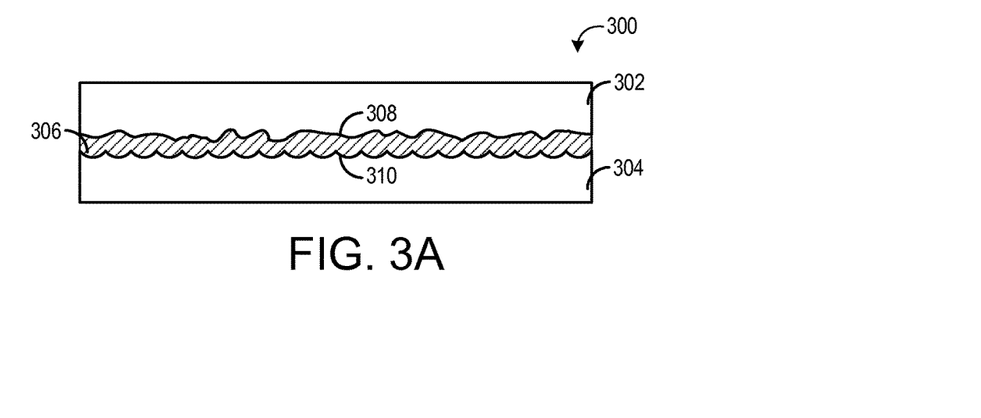

FIG. 3A illustrates a second laminated diffuser 300 according to an embodiment of the present disclosure. Laminated diffuser 300 is one non-limiting example of laminated diffuser 102 of FIG. 1. Similar to laminated diffuser 200, laminated diffuser 300 includes two diffuser layers optically coupled to an adhesive layer. Laminated diffuser 300 includes a first diffuser film 302 having a first diffusing surface 308 that is optically coupled to an adhesive layer 306. First diffuser film 302, first diffusing surface 308, and adhesive layer 306 may be substantially similar to first diffuser film 202, first diffusing surface 208, and adhesive layer 206 of laminated diffuser 200 of FIG. 2A. The second diffuser layer of laminated diffuser 300 is a microlens array 304 optically coupled to adhesive layer 306. Microlens array 304 includes a lens surface 310 optically coupled to the adhesive layer 306.

By including a microlens array, a top hat angular light distribution is produced upon the light exiting the laminated diffuser and the possible increased sparkle grain size produced by the microlens array may be reduced by the combined convolved output of the microlens and diffuser film and/or by using a negative lenslet profile. In one example, a negative (divergent) microlens array may be used in order to reduce sparkle contrast for a given z thickness, as the light exiting such a microlens array is primarily divergent and thus does not pass through a real focus. By configuring the microlens array so that light does not pass through a convergent, real focus, sparkle sensitivity that may result from light passing through a nearby focus and then interacting with the following diffuse surface structure may be reduced.

Figure 3B:
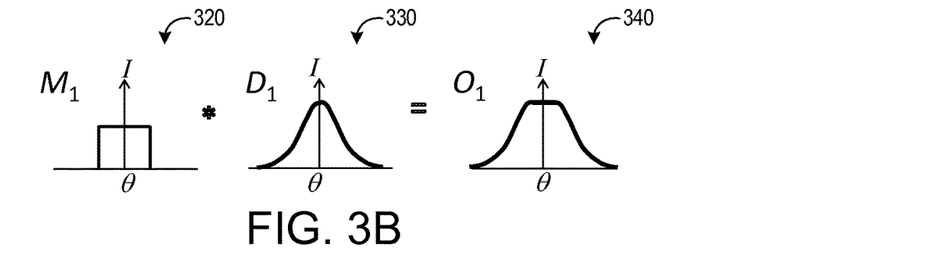

FIG. 3B illustrates a microlens array with a near flat-top angular profile 320 convolved with a Gaussian angular profile 330 (such as from a circular diffuser film) that results in an output angular profile 340 which has an intensity plateau in the central region and a roll-off of intensity at output edges.

Microlens array 304 may include any suitable pattern, including 1-dimensional (lenticular), square, rectangular, or hexagonal patterns. A 1-dimensional (also referred to as lenticular) array may have substantially cylindrical or extruded acylindrical profiled lenslets. The microlens array may have a tiling pattern which results in a square, rectangular, or hexagonal grid array, and utilize spherical or aspherical surfaced lenslet sag profile. The resulting single cell tile correlates to the angular contour shape exhibited by the microlens array, such that a square array exhibits approximately a square angular contour shape, etc. When combining a microlens array with a Gaussian diffuser, an angular contour shape having rounded corners may be formed. The level of rounding depends on the relative size of the circular diffuser compared to the size of the shape microlens output in angle space.

Figure 3C:
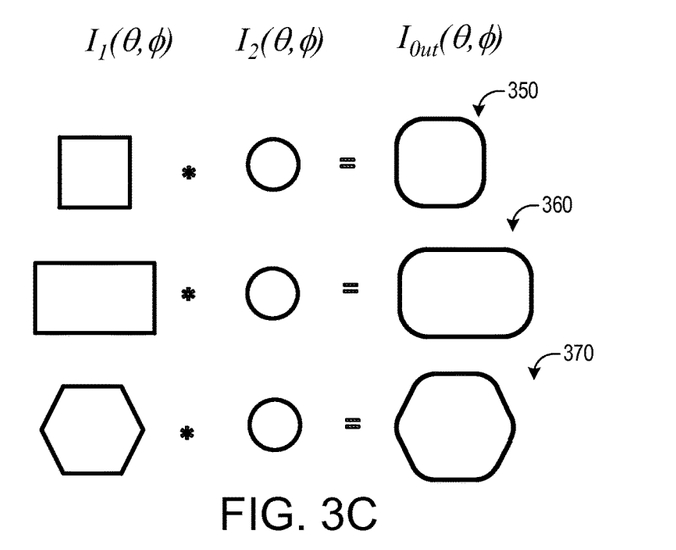

By combining a circular diffuser film with a microlens array, various exit cone shapes may be produced. FIG. 3C illustrates the angular contour shapes resulting from various convolutions of square, rectangular, and hexagonal with circular angular contour shapes. As shown in FIG. 3C, diagram 350, when a square microlens array is combined with a circular diffuser film, a rounded flat-top having a rounded square exit cone (solid angle) shape is produced, while diagram 360 shows that when a rectangular microlens array is combined with a circular diffuser film, a rounded flat-top having rounded rectangle exit cone (solid angle) shape is produced, and diagram 370 shows that when a hexagonal microlens array is combined with a circular diffuser film, a rounded flat-top having rounded hexagonal exit cone (solid angle) shape is produced.

Figure 4A:
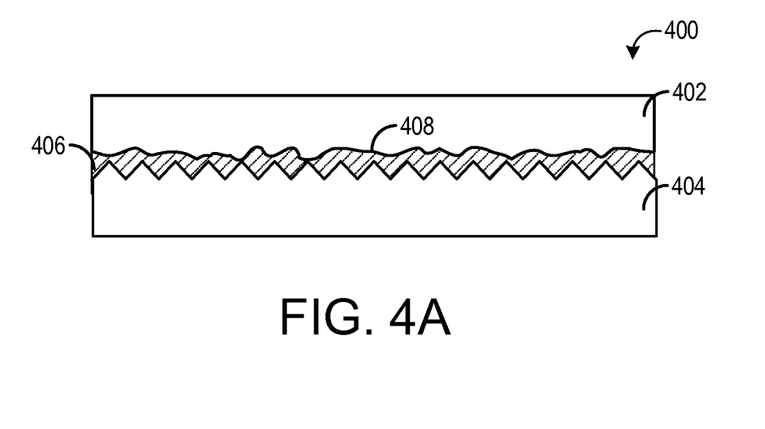

FIG. 4A illustrates a third laminated diffuser 400 according to an embodiment of the present disclosure. Laminated diffuser 400 is one non-limiting example of laminated diffuser 102 of FIG. 1. Similar to laminated diffuser 200, laminated diffuser 400 includes a first diffuser film 402 having a first diffusing surface 408 that is optically coupled to an adhesive layer 406. First diffuser film 402, first diffusing surface 408, and adhesive layer 406 may be substantially similar to first diffuser film 202, first diffusing surface 208, and adhesive layer 206 of laminated diffuser 200 of FIG. 2A. The second diffuser layer of laminated diffuser 400 includes a prismatic array 404 coupled to the adhesive layer 406. The presence of a Gaussian angular profiled diffuser (e.g., diffuser film 402) having a prescribed exit cone angular contour shape having a moderately small to medium exit angle (e.g., FWHM~10° to 30°), may cause roll-off in luminance across the field of view for display applications due to the sharpness of the angular profile near the peak. A prismatic array may be used to address this roll-off with a slight widening or flattening of the peak plateau while significantly maintaining the angular profile for higher exit angle light. Such a prismatic array may be 1D linear or 2D pyramidal or a 2D axicon array. Further, such prismatic arrays may form a small plateau near the peak light output.

Figure 4B:
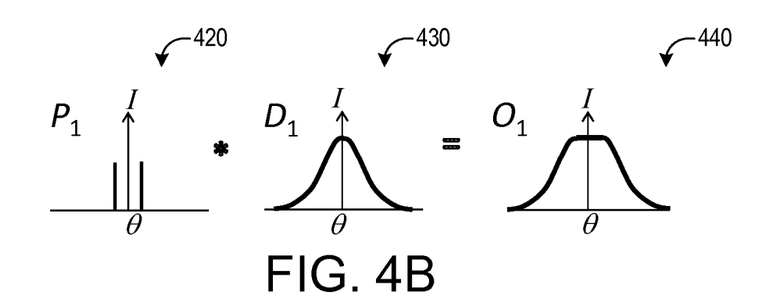

A prismatic array function can be represented by two offset delta functions having an angular separation defined by the slope of the prismatic ramp, or facet, sag profile, along with delta in refractive index seen at adhesive-to-prismatic array interface. By adjusting this prismatic strength or the angular width of the diffuser Gaussian angular profile, for the case of convolving a prismatic array with a Gaussian diffuser, various resulting output profiles characteristics may be formed. For example, FIG. 4B illustrates a convolution of a delta function (dual due to 1D prismatic array, or annular ring due to axicon array, or quad due to pyramidal prismatic array) with a Gaussian angular profile, resulting in an angular profile having a plateau region and edge roll-off regions. FIG. 4B shows the output angular profile 420 of a first prismatic array having a first prismatic strength convolved with a diffuser having a Gaussian angular profile 430, resulting in a central plateau output angular profile 440.

Figure 4C:
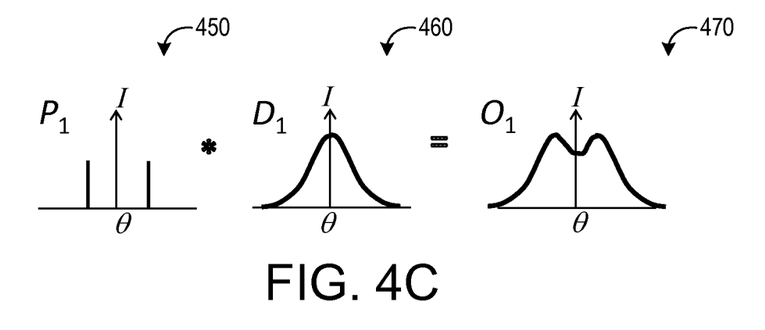

FIG. 4C illustrates a convolution of a delta function (dual due to 1D prismatic array, or annular ring due to axicon array, or quad due to pyramidal prismatic array) with a Gaussian angular profile, resulting in an angular profile having a central dip region and edge roll-off regions. FIG. 4C shows the output angular profile 450 of a second prismatic array having a second prismatic strength convolved with a diffuser having a Gaussian angular profile 460, resulting in a central dip output angular profile 470.

Figure 5:
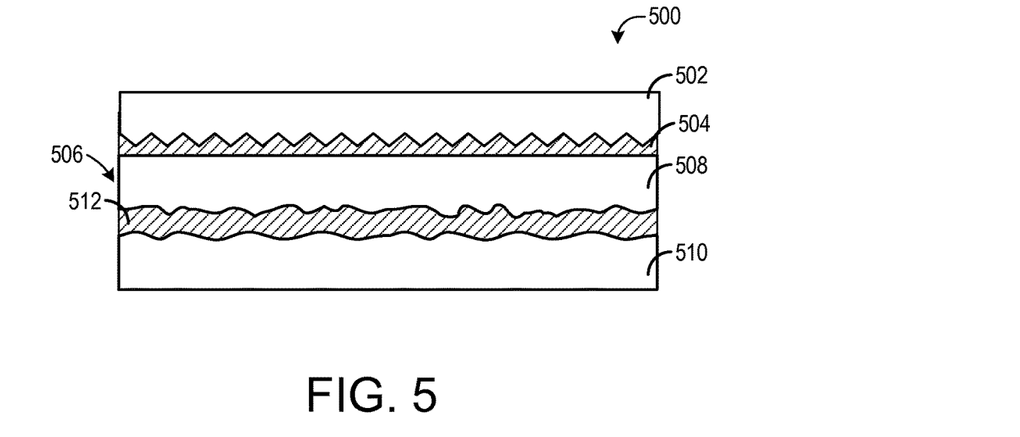

When a prismatic array is included, the laminated diffuser may include a prismatic array (1D linear array or 2D, pyramidal or conic/axicon array) coupled to a single diffuser film (as shown in FIG. 4A). In other examples, a prismatic array may be coupled to a double diffuser, as illustrated in FIG. 5. The laminated diffuser 500 of FIG. 5 includes a prismatic array 502 (similar to the prismatic array 404 of FIG. 4A) optically coupled via a first adhesive layer 504 to a double diffuser 506.

The double diffuser 506 may be substantially similar to the laminated diffuser 200 of FIG. 2A, and thus includes a first diffuser film 508, a second diffuser film 510, and a second adhesive layer 512 coupling the first diffuser film to the second diffuser film. Each of first diffuser film 508 and second diffuser film 510 includes a non-diffusing surface opposite the respective diffusing surface. The prismatic array 502 is coupled to the smooth, outer non-diffusing surface of the first diffuser film 508, and the diffusing surfaces of the double diffuser are buried in the double diffuser 506.

The first adhesive layer 504 and the second adhesive layer 512 may be comprised of similar material (e.g., have the same refractive index), or they may be comprised of different material and/or have different indices of refraction. The thickness of the first adhesive layer 504 may be greater than, equal to, or less than the thickness of the second adhesive layer 512.

Figure 6:
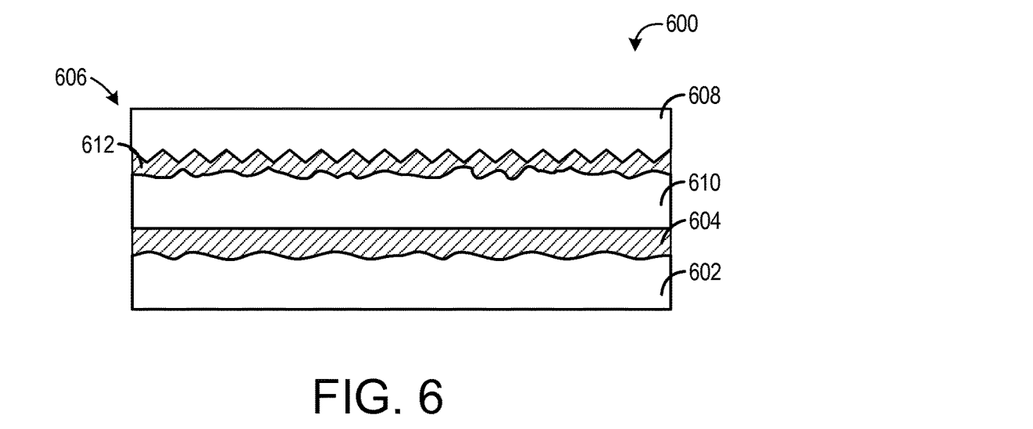

In a further example, a prismatic array may be optically coupled to a diffuser film, similar to the laminated diffuser of FIG. 4A, and an additional diffuser film may be coupled to the prismatic array/diffuser film stack, as shown in FIG. 6. The laminated diffuser 600 of FIG. 6 includes a first diffuser film 602 coupled via a first adhesive layer 604 to a prismatic array/diffuser film stack 606. The prismatic array/diffuser film stack 606 may be substantially similar to the laminated diffuser 400 of FIG. 4A, and thus includes a prismatic array 608, a second diffuser film 610, and second adhesive layer 612 coupling the prismatic array 608 to the second diffuser film 610. The diffusing surface of the first diffuser film 602 is coupled to the smooth, outer non-diffusing surface of the second diffuser film 610 (opposite the diffusing surface of the second diffuser film) of the prismatic array/diffuser film stack 606.

Figure 7:
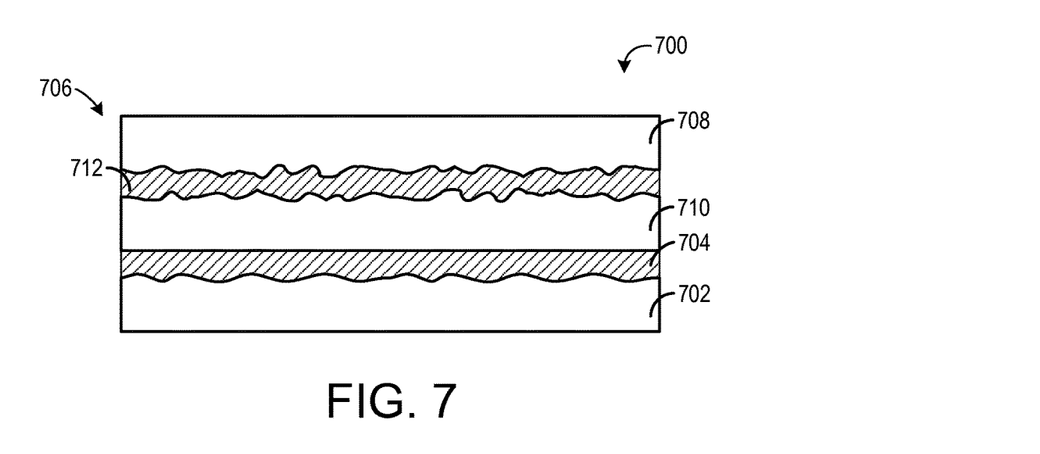

Thus, the laminated diffusers of FIGS. 5 and 6 include more than two diffusing elements (e.g., two diffuser films and a prismatic array). FIG. 7 shows another example of a multiple diffuser configuration. Laminated diffuser 700 includes a first diffuser film 702 optically coupled via a first adhesive layer 704 to a non-diffusing surface of double diffuser 706. Double diffuser 706 may be substantially similar to the laminated diffuser 200 of FIG. 2A, and thus includes a second diffuser film 708, a third diffuser film 710, and a second adhesive layer 712 coupling the second diffuser film 708 to the third diffuser film 710.

Thus, laminated diffuser 700 includes a first optical element having a first diffusing surface and a second optical element having a second diffusing surface and an adhesive layer coupling the first diffusing surface to the second diffusing surface. The second optical element has a non-diffusing surface, opposite the second diffusing surface. The laminated diffuser further comprises a second adhesive layer and a third optical element having a third diffusing surface, the second adhesive layer optically coupling the third diffusing surface of the third optical element to the non-diffusing surface of the second optical element.

Figure 8:
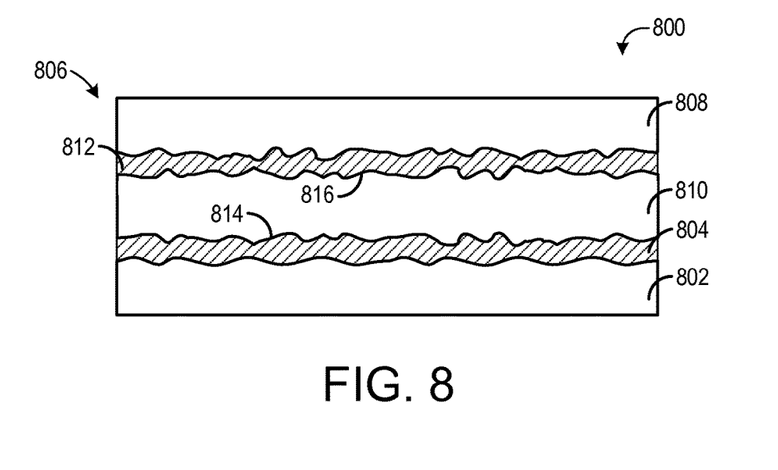

In some examples, one or more of the optical elements included in a laminated diffuser may include more than one diffusing surface. For example, an optical element, such as a diffuser film, may include two diffusing surfaces opposite each other. In such cases, each diffusing surface of the optical element may be coupled to an adhesive layer. FIG. 8 illustrated an example laminated diffuser similar to the laminated diffuser of FIG. 7. However, one of the optical elements (the middle diffuser film) includes two diffusing surfaces. Specifically, laminated diffuser 800 includes a first diffuser film 802 optically coupled via a first adhesive layer 804 to a diffusing surface of double diffuser 806. Double diffuser 806 may be substantially similar to the laminated diffuser 200 of FIGS. 2A-2C, and thus includes a second diffuser film 808, a third diffuser film 810, and a second adhesive layer 812 coupling the second diffuser film 808 to the third diffuser film 810. Unlike the laminated diffuser 200 of FIGS. 2A-2C, the third diffuser film 810 may include an additional diffusing surface 814, opposite the first diffusing surface 816 of the third diffuser film.

Thus, laminated diffuser 800 includes three optical elements, four diffusing surfaces, and two adhesive layers, where one of the optical elements includes two diffusing surfaces. Each adhesive layer couples a diffusing surface of an optical element to an opposing diffusing surface of a different optical element. While laminated diffuser 800 includes three diffuser films, with one diffuser films including two diffusing surfaces, it is to be understood that virtually any of the above-described laminated diffusers (e.g., the laminated diffusers of FIGS. 2A-7) could include one or more optical elements having two diffusing surfaces.

When more than three surface diffusers are laminated together, it is expected that the scattered light may be distributed into an angular profile approaching more toward Lambertian than Gaussian, thus providing less diffusing power control. However, use of more than two surface diffusers may be utilized to achieve exit profiles similar to Gaussian when the resulting output exit angle is low to moderate in view angle and results from substantially-equal diffuse contribution of each surface diffuser. Thus, to a degree, further multiple diffuser surfaces may be used to further reduce sparkle contrast, due to additional mixing and homogenization along z dimension, up to a point where the resulting convolved output exit angle is significantly beyond low to moderate. As such, it may be useful to add layers to reduce sparkle contrast up to a point where scatter into higher view angles is no longer acceptable. This provides better control on the diffusing power. Additionally, multiple diffusers include fewer sparkle problems due to added mixing of the light along the z propagation distance.

However, the multiple (three or more) diffuser configuration causes more change in the polarization of the light, but the light polarization changes may be limited by design of the final exit cone (independent of the number of diffusers in the stack) by proper combination of diffuse strength of the diffuser layers and lamination refractive index. The additional diffusers result in a thicker stack and a more complicated fabrication process, thus lowering overall yield.

For the above-described examples, it will be appreciated that the input source may have an angular width, such as the output of alight guide plate (LGP) from a backlight unit. As such, the complete output response would comprise a convolution of the input source and the first optical function and the second optical function of the laminated diffuser stack. Subsequent diffuser or optical layers would invoke and additional convolution for that given layer optical function.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention clamed is:

1. An optical diffusion device, comprising:
a first optical element including a first diffuser film including a first diffusing surface having a circular angular contour shape;
a second optical element including a second diffusing surface; and
an adhesive layer optically coupling the first diffusing surface to the second diffusing surface without any intervening air gaps.

2. The optical diffusion device of claim 1, wherein the adhesive layer has a different refractive index than a refractive index of the first diffusing surface or the second diffusing surface.

3. The optical diffusion device of claim 1, wherein the second optical element is a second diffuser film.

4. The optical diffusion device of claim 3, wherein the second diffuser film comprises a diffuser film having an elliptical angular contour shape.

5. The optical diffusion device of claim 3, wherein the second diffuser film comprises a diffuser film having a circular angular contour shape.

6. The optical diffusion device of claim 1, wherein the second optical element has a non-diffusing surface, opposite the second diffusing surface, and further comprising a second adhesive layer and a third optical element having a third diffusing surface, the second adhesive layer optically coupling the third diffusing surface of the third optical element to the non-diffusing surface of the second optical element.

7. The optical diffusion device of claim 1, wherein the second optical element is a periodic micro-optical array.

8. The optical diffusion device of claim 7, wherein the periodic micro-optical array comprises a microlens array.

9. The optical diffusion device of claim 8, wherein the microlens array is a divergent microlens array.

10. The optical diffusion device of claim 8, wherein the microlens array comprises one of a square array, a rectangular array, or a hexagonal array.

11. The optical diffusion device of claim 7, wherein the microlens array comprises a lenticular array.

12. The optical diffusion device of claim 7, wherein is the periodic array comprises a prismatic array.

13. The optical diffusion device of claim 1, wherein the second optical element has a third diffusing surface, opposite the second diffusing surface, and further comprising a second adhesive layer and a third optical element having a fourth diffusing surface, the second adhesive layer optically coupling the third diffusing surface of the second optical element to the fourth diffusing surface of the third optical element.

14. An optical device, comprising:
a laminated diffuser including an adhesive layer optically coupling a first diffusing surface having an elliptical angular contour shape to a second diffusing surface; and
a display device coupled to the laminated diffuser.

15. The optical device of claim 14, wherein the adhesive layer has a lower refractive index than a refractive index of the first diffusing surface or the second diffusing surface.

16. The optical device of claim 14, wherein the first diffusing surface and the second diffusing surface are each diffusing surfaces of respective diffuser films.

17. An optical device, comprising:
a laminated diffuser including an adhesive layer coupling a first diffusing surface of a first diffuser film having a circular or elliptical angular contour shape to a second diffusing surface of a second diffuser film having a circular or elliptical angular contour shape, the adhesive layer having a lower refractive index than a refractive index of the first diffusing surface or the second diffusing surface; and
a display device coupled to the laminated diffuser.

* * * * *